United States Patent
Sakurai et al.

(10) Patent No.: US 8,605,378 B2
(45) Date of Patent: Dec. 10, 2013

(54) INSPECTION DEVICE AND INSPECTION METHOD FOR INSPECTING MAGNETIC DISK OR MAGNETIC HEAD

(75) Inventors: Yoshihiro Sakurai, Kamisato (JP); Kunihito Higa, Kamisato (JP); Yukio Yamamoto, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 123 days.

(21) Appl. No.: 13/372,536

(22) Filed: Feb. 14, 2012

(65) Prior Publication Data

US 2012/0250175 A1    Oct. 4, 2012

(30) Foreign Application Priority Data

Mar. 30, 2011 (JP) ................................. 2011-076646

(51) Int. Cl.
 *G11B 27/36* (2006.01)
(52) U.S. Cl.
 USPC ............................. 360/31; 360/51; 369/53.14
(58) Field of Classification Search
 None
 See application file for complete search history.

(56) References Cited

U.S. PATENT DOCUMENTS

| 5,615,191 | A | | 3/1997 | Takeda et al. | |
|---|---|---|---|---|---|
| 5,745,455 | A | * | 4/1998 | Takeda et al. | 360/51 |
| 5,907,448 | A | * | 5/1999 | Watanabe et al. | 360/51 |
| 6,144,517 | A | * | 11/2000 | Watanabe et al. | 360/51 |
| 6,381,292 | B1 | * | 4/2002 | Yamakoshi | 375/376 |
| 8,000,045 | B2 | | 8/2011 | Makuuchi et al. | |
| 2010/0067135 | A1 | * | 3/2010 | Makuuchi et al. | 360/31 |

FOREIGN PATENT DOCUMENTS

| JP | 6-223502 | 8/1994 |
|---|---|---|
| JP | 2010-49775 | 3/2010 |

* cited by examiner

*Primary Examiner* — Thang Tran
(74) *Attorney, Agent, or Firm* — Antonelli, Terry, Stout & Kraus, LLP.

(57) ABSTRACT

The present invention realizes reduction of position information demodulation errors caused by the eccentricity of the magnetic disk and improvement of position signal detection accuracy, as well as enabling quick eccentricity clock correction for arbitrary clock frequencies. An inspection device in accordance with the present invention comprises: a servo demodulation unit which demodulates servo information; a PLL clock generating unit which generates a reference clock and supplies the reference clock to the servo demodulation unit; and a tester control unit. The PLL clock generating unit includes an eccentricity correction circuit for correcting the frequency of the reference clock depending on the eccentricity of the magnetic disk. The tester control unit generates correction data for correcting the frequency of the reference clock, multiplies the correction data by the inverse of a transfer function of the PLL clock generating unit, and supplies the product to the eccentricity correction circuit.

5 Claims, 9 Drawing Sheets

TRACK POSITION ACQUISITION DATA WHEN THERE EXISTS ECCENTRICITY
(WITHOUT CLOCK CORRECTION)

APPROXIMATED CURVE OF FIG. 6A

TRACK POSITION ACQUISITION DATA WHEN THERE EXISTS ECCENTRICITY
(WITH CLOCK CORRECTION)

INSPECTION DEVICE AND INSPECTION METHOD FOR INSPECTING MAGNETIC DISK OR MAGNETIC HEAD

CLAIM OF PRIORITY

The present application claims priority from Japanese patent application serial No. JP2011-076646, filed on Mar. 30, 2011, the content of which is hereby incorporated by reference into this application.

BACKGROUND OF THE INVENTION (1) Field of the Invention

The present invention relates to an inspection device and an inspection method for inspecting a magnetic disk or a magnetic head, and in particular, to an inspection device and an inspection method capable of conducting the inspection with high accuracy even when the format of the servo pattern written on the magnetic disk varies.

(2) Description of the Related Art

Magnetic disks to which the servo pattern has previously been written by stamper technology and microscopic processing technology (e.g., nano-printing) for realizing high data density (DTM (Discrete Track Media), BPM (Bit Patterned Media), magnetic transfer media, etc.) are becoming the mainstream of the magnetic disks for HDDs (Hard Disk Drives) in recent years. An inspection device for inspecting a magnetic disk or a magnetic head is required to check whether the quality of the magnetic disk or magnetic head is good or not by reading and writing test data from/to data areas of the disk while demodulating the servo pattern written on the magnetic disk, suppressing the track deviation (deviation of the head from the intended track) caused by the wobbling of the disk surface, the eccentricity (decentering) of the disk, etc., and executing on-track servo control.

If a magnetic disk has an eccentricity, the read/write operation from/to the disk generally becomes unstable due to a fluctuation in the cycle of the clock signal reproduced from the magnetic disk. In the demodulation of the servo pattern, demodulation errors of position information (track code, sector code) and position signal detection errors increase in proportion to the magnitude of the eccentricity. To deal with this problem, JP-A-6-223502 has proposed a clock signal correction circuit comprising a voltage-controlled oscillator, storage means which stores signals corresponding to eccentricities of the disk, and correction means which changes the phase or the frequency of the clock signal outputted by the voltage-controlled oscillator according to the signal (corresponding to a certain eccentricity) stored in the storage means.

Further, the format of the servo pattern varies depending on the drive maker or the model of the drive even in the same drive maker. Therefore, correctly demodulating the servo pattern requires an inspection conducted by acquiring a special-purpose channel control IC corresponding to each servo pattern, which has involved problems of complicated and troublesome work and a cost rise. To address these problems, JP-A-2010-49775 has proposed a general-purpose servo demodulation circuit capable of dealing with a plurality of servo patterns by setting information in a part of the servo pattern (partial information) as a detection pattern, comparing a demodulated pattern of the partial information with the detection pattern, and controlling operation timing of the inspection according to the result of the comparison.

SUMMARY OF THE INVENTION

However, the JP,A 6-223502 has not considered a quick processing method for the eccentricity correction in regard to arbitrary disk revolution speeds and arbitrary servo pattern frequencies. Meanwhile, the JP-A-2010-49775 has not considered the accuracy of the servo pattern demodulation when there is a disk eccentricity. Therefore, if a disk eccentricity exists when the servo pattern format or the disk revolution speed varies, the eccentricity correction can not be made quickly, causing the position information demodulation errors and deterioration in the position signal detection accuracy.

It is therefore the primary object of the present invention to provide an inspection device and an inspection method for inspecting a magnetic disk or a magnetic head capable of realizing reduction of the position information demodulation errors caused by the eccentricity of the magnetic disk and improvement of the position signal detection accuracy, as well as enabling quick eccentricity clock correction for arbitrary clock frequencies.

In accordance with an aspect of the present invention, there is provided an inspection device for a magnetic disk or a magnetic head which measures a characteristic of the magnetic disk or the magnetic head by controlling the magnetic head based on servo information written on the magnetic disk and reading or writing a signal from/to the magnetic disk, comprising: a servo demodulation unit which demodulates the servo information read out from the magnetic disk; a PLL clock generating unit which generates a reference clock corresponding to the frequency of the servo information read out from the magnetic disk and supplies the reference clock to the servo demodulation unit; and a tester control unit which controls the operation of the inspection device. The PLL clock generating unit includes an eccentricity correction circuit for correcting the frequency of the reference clock depending on an eccentricity of the magnetic disk. The tester control unit generates correction data for correcting the frequency of the reference clock, multiplies the correction data by the inverse of a transfer function of the PLL clock generating unit, and supplies the product to the eccentricity correction circuit.

In accordance with another aspect of the present invention, there is provided an inspection method for a magnetic disk or a magnetic head for measuring a characteristic of the magnetic disk or the magnetic head by controlling the magnetic head based on servo information written on the magnetic disk and reading or writing a signal from/to the magnetic disk, comprising the steps of: demodulating the servo information read out from the magnetic disk according to a reference clock; generating the reference clock corresponding to the frequency of the servo information read out from the magnetic disk using a PLL clock generating unit; and correcting the frequency of the reference clock depending on an eccentricity of the magnetic disk. The step of correcting the frequency of the reference clock generates correction data corresponding to the eccentricity of the magnetic disk, multiplies the correction data by the inverse of a transfer function of the PLL clock generating unit, and supplies the product to the PLL clock generating unit.

According to the present invention, the position information demodulation errors of the servo demodulation circuit are reduced and the position signal detection accuracy is improved even when there exists the disk eccentricity. Further, quick eccentricity clock correction becomes possible for arbitrary clock frequencies. With these effects, high-accuracy and high-performance inspection device and inspection method for inspecting a magnetic disk or a magnetic head can be provided.

DETAILED DESCRIPTION OF THE EMBODIMENT

Figure 1:
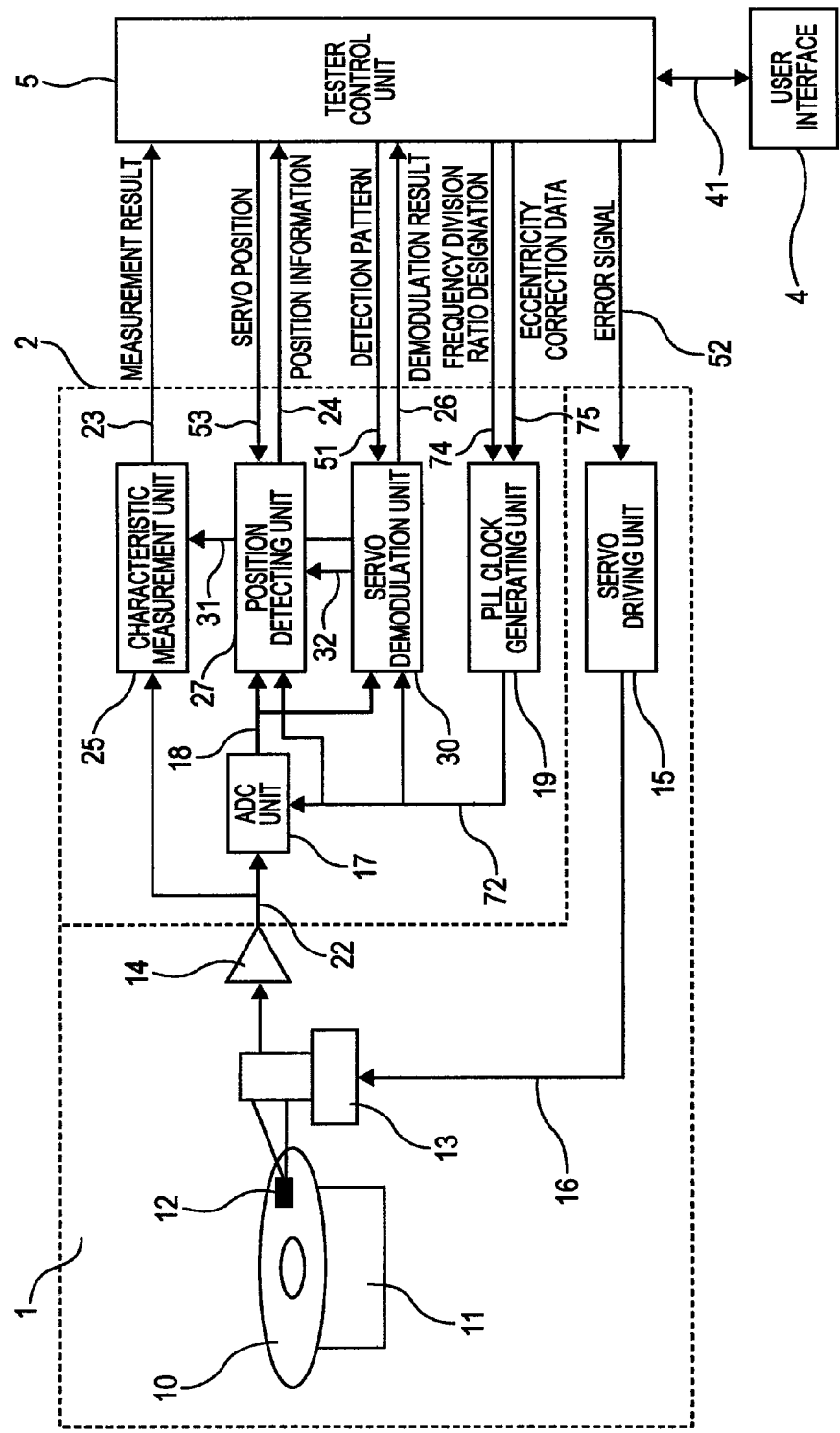
FIG. 1 is a block diagram showing an inspection device in accordance with an embodiment of the present invention.

Referring now to the drawings, a description will be given in detail of a preferred embodiment in accordance with the present invention.

First, the servo pattern on a magnetic disk to be processed in the present invention will be explained below.

Figure 10:
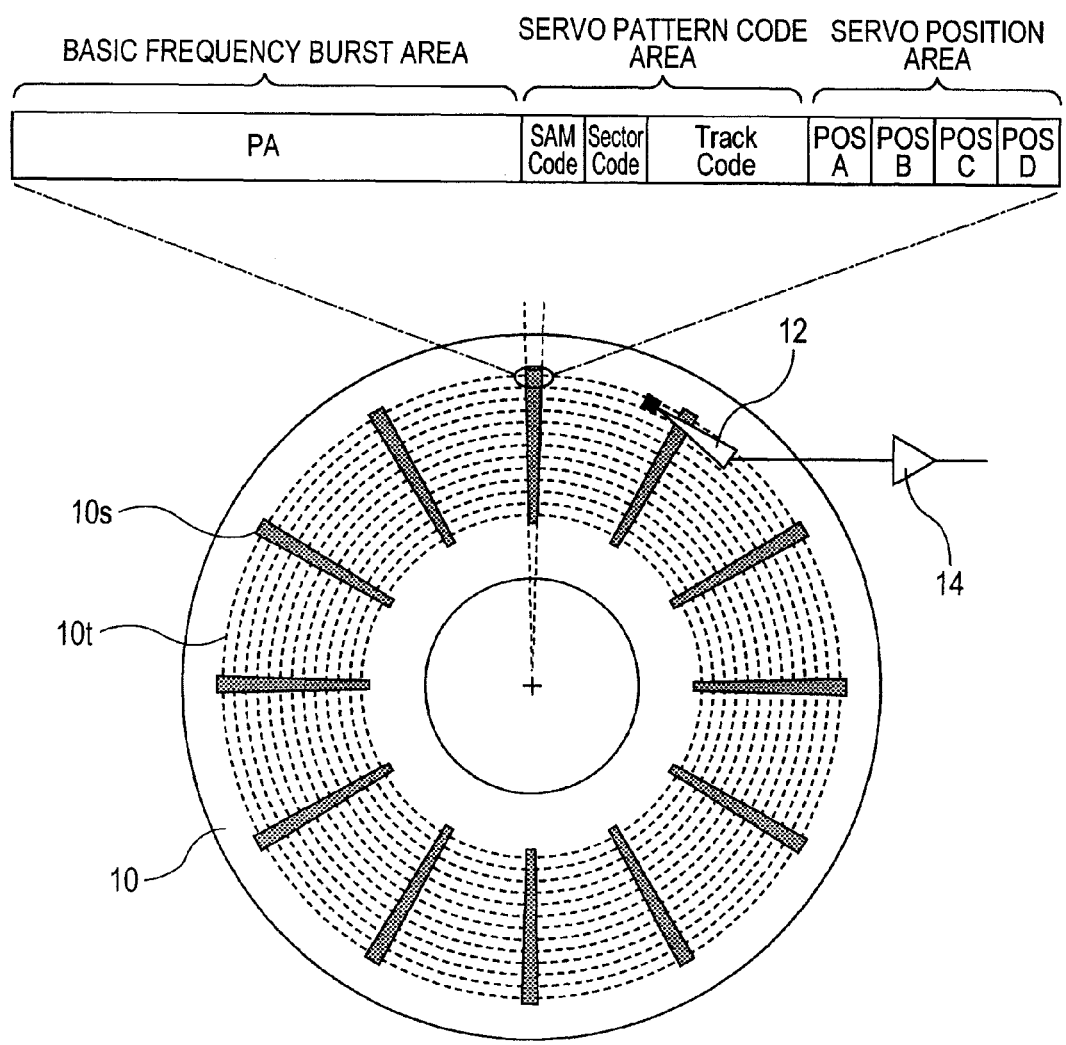
FIG. 10 is a schematic diagram showing an example of a servo pattern on a magnetic disk.

FIG. 10 is a schematic diagram showing an example of the servo pattern written on a magnetic disk. A plurality of tracks 10t are formed as concentric circles on a disk surface of the magnetic disk 10. Each track includes a plurality of servo areas (servo sectors) 10s and data areas which are used for the actual data recording/reproduction. The reference character "12" represents a magnetic head and "14" represents an amplifier for amplifying a read signal. While the servo information format in the servo areas 10s varies depending on the HDD maker and the HDD type, a typical example is shown in FIG. 10. The area "PA" (Preamble Field) is used for preparation till the reading of the servo areas. A waveform with a single frequency (burst signal) is recorded in the area "PA". In the area "SAM" (Servo Address), a marker code indicating the starting point of the servo area is recorded. In the area "Sector", a sector number code is recorded. In the area "Track", a track number code is recorded. The marker code, the sector number code and the track number code mentioned above are collectively called a "servo pattern code". The area in which the servo pattern code is recorded is called a "servo pattern code area". In each area "POS" (A, B, C, D) (servo position area), a servo position signal (servo position) used for acquiring microscopic position information finer than one track width is recorded.

Next, an inspection device for inspecting a magnetic head or a magnetic disk in accordance with the present invention will be described below.

FIG. 1 is a block diagram showing an inspection device for inspecting a magnetic head or a magnetic disk (hereinafter referred to simply as an "inspection device") in accordance with an embodiment of the present invention.

The inspection device of this embodiment is mainly composed of a magnetic head driving unit 1, a signal processing unit 2 which processes an analog read signal 22 inputted from the magnetic head driving unit 1, a signal writing unit (unshown) which writes signals to the magnetic disk, a user interface 4 which lets the user input instructions regarding the operation of the inspection device, displays the result of the inspection, etc., and a tester control unit 5 which controls the components and sends/receives signals to/from the components. Each component of the inspection device is configured as described below.

In the magnetic head driving unit 1, a spin stand 11 holds and rotates (spins) the magnetic disk 10. A R/W (read/write) magnetic head 12 conducts the signal reading/writing from/to the magnetic disk 10. An R (read) amplifier 14 amplifies the read signal from the R/W magnetic head 12. A stage 13 holding the R/W magnetic head 12 is controlled by a servo driving unit 15. The servo driving unit 15 receives an error signal 52 (indicating the difference between the current track position of the R/W magnetic head 12 and a measurement target track position) from the tester control unit 5 and thereby generates a stage control signal 16 for controlling the stage 13.

In the signal processing unit 2, an ADC (Analog-Digital Converter) unit 17 converts the analog read signal 22 amplified by the R amplifier 14 into a digital read signal 18. A servo demodulation unit 30 demodulates the digital read signal 18 into a servo pattern (demodulation result 26), compares the demodulation result 26 with detection patterns 51 set by the tester control unit 5, and thereby judges the format of the inspection target (servo pattern of the disk). A position detecting unit 27 compares the digital read signal 18 with a servo position signal 53 specified by the tester control unit 5 according to a timing signal 32 outputted by the servo demodulation unit 30 and thereby detects position information 24 indicating the displacement (position error) of the R/W magnetic head 12 from the currently specified track. A characteristic measurement unit 25 detects a prescribed characteristic of the inspection target (the magnetic head 12 or the magnetic disk 10) from the analog read signal 22 according to a timing signal 31 outputted by the servo demodulation unit 30 and outputs the measurement result 23. A PLL (Phase-Locked Loop) clock generating unit 19 receives a frequency division ratio designation 74 (designated by the tester control unit 5 for setting an arbitrary frequency) and eccentricity correction data 75 (for compensating for a frequency deviation of the analog read signal 22 of the servo pattern caused by the eccentricity of the magnetic disk 10), generates a servo demodulation reference clock output 72 (reference clock output 72 for the servo demodulation) corresponding to the read signal frequency, and supplies the reference clock output 72 to the ADC unit 17, the servo demodulation unit 30 and the position detecting unit 27.

Figure 2:
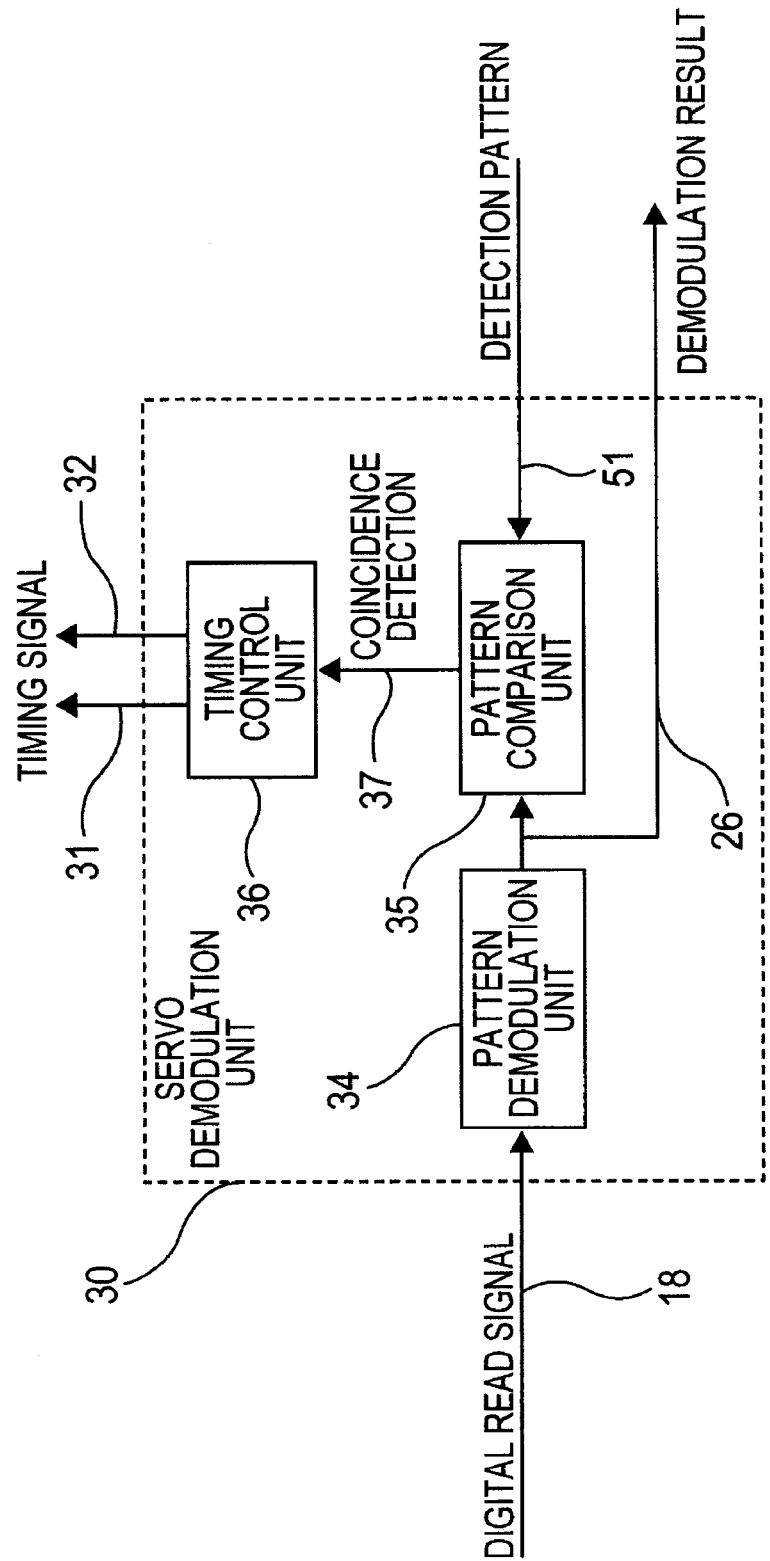
FIG. 2 is a block diagram showing the internal configuration of a servo demodulation unit.

FIG. 2 is a block diagram showing the internal configuration of the servo demodulation unit 30 in this embodiment. A pattern demodulation unit 34 demodulates the aforementioned servo pattern code (SAM, Sector, Track) into a digital signal pattern based on the digital read signal 18 and outputs the demodulation result 26 to the tester control unit 5. A pattern comparison unit 35 compares the pattern sequence of the digital signal pattern of the demodulation result 26 with a SAM pattern code of the detection pattern 51 outputted by the tester control unit 5 and outputs a coincidence detection signal 37 when the two inputs coincide with each other. A timing control unit 36 outputs the timing signals 31 and 32 (for controlling the starting time or duration of each operation) to the characteristic measurement unit 25 and the position detecting unit 27, respectively, with timings prescribed based on the coincidence detection signal 37.

With the configuration described above, servo control corresponding to (suitable for) the particular magnetic disk 10 is made possible in the inspection device of this embodiment by associating a detection pattern 51 set by the tester control unit 5 with the servo pattern written on the magnetic disk 10.

Also when multiple types of magnetic disks differing in the format of the servo pattern are used, setting the detection pattern 51 corresponding to the servo pattern of each disk enables the single inspection device to deal with the multiple types of magnetic disks. The detection pattern 51 is generated by the tester control unit 5 via a tester control signal 41 based on a setting or input made by the user through the user interface 4 depending on the servo pattern.

Further, in this embodiment, the PLL clock generating unit 19 generates the servo demodulation reference clock output 72 corresponding to the read signal frequency in order to compensate for the eccentricity of the magnetic disk 10. This makes it unnecessary to change an eccentricity correction table (explained later) for each setting change of the clock frequency and the disk revolution speed, while making it possible to implement the eccentricity correction of the clock frequency with ease even with arbitrary settings of the clock frequency and the disk revolution speed. The method of correcting the clock frequency for the disk eccentricity will be explained below.

Figure 3:
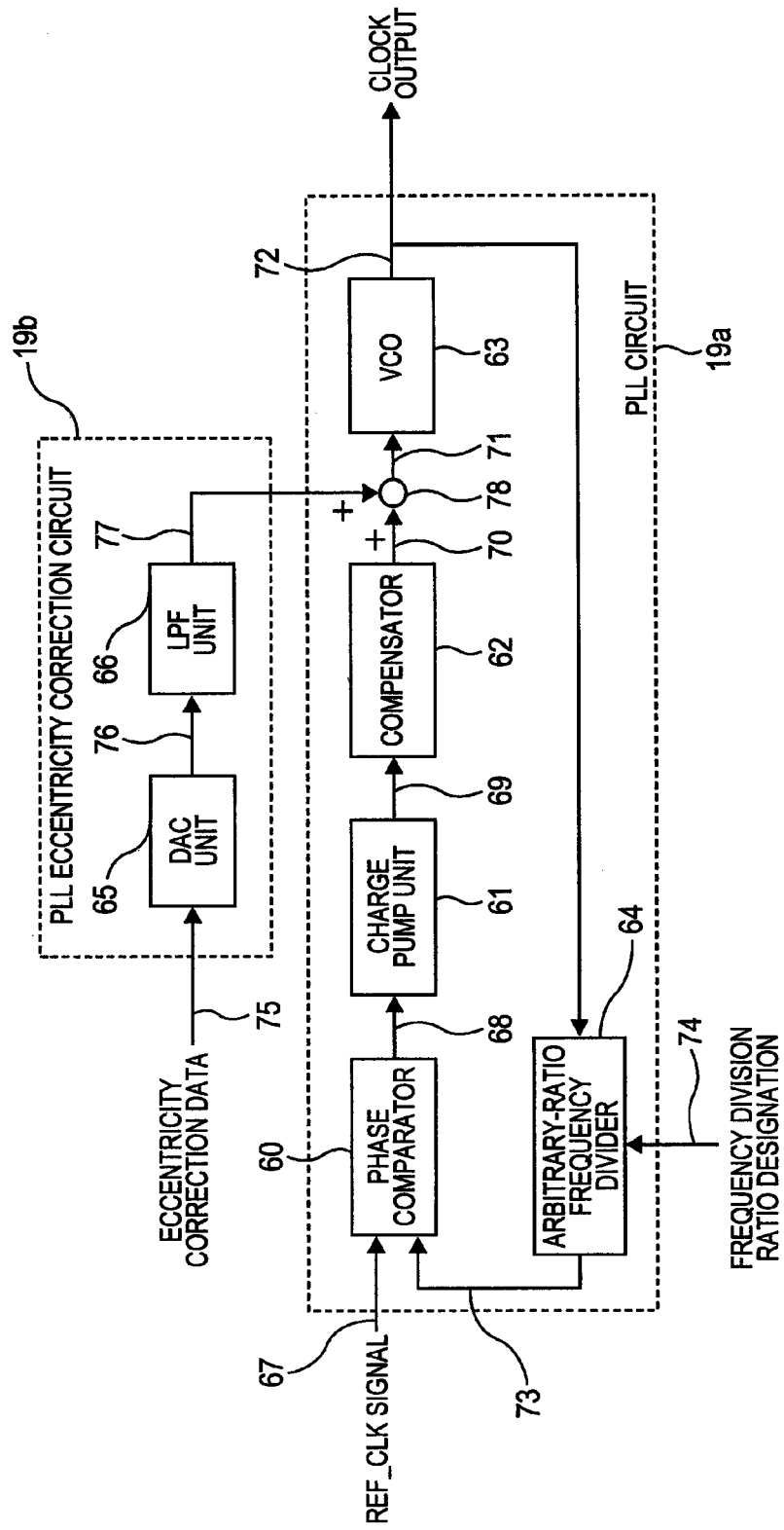
FIG. 3 is a block diagram showing the internal configuration of a PLL clock generating unit.

FIG. 3 is a block diagram showing the internal configuration of the PLL clock generating unit 19 in this embodiment. The PLL clock generating unit 19 includes a PLL circuit 19a which generates a clock at an arbitrarily designated frequency and a PLL eccentricity correction circuit 19b which corrects the clock frequency (of the clock generated by the PLL circuit 19a) depending on the disk eccentricity.

In the PLL circuit 19a, a phase comparator 60 compares the phase of a REF_CLK signal 67 (clock signal at a fixed frequency) with the phase of a frequency division output clock signal 73 outputted by an arbitrary-ratio frequency divider 64 and outputs a phase difference pulse signal 68. A charge pump unit 61 converts the phase difference pulse signal 68 into a phase difference voltage signal 69. A compensator 62 sets a filter and a gain for stabilizing the PLL loop control. A VCO (Voltage Control Oscillator) 63 changes the oscillating frequency of the clock signal 72 (outputted from the PLL circuit 19a) according to input voltage 71. The arbitrary-ratio frequency divider 64 divides the frequency of the clock output 72 of the VCO 63 by an arbitrarily designated ratio according to the frequency division ratio designation 74 outputted by the tester control unit 5.

In the PLL eccentricity correction circuit 19b, a DAC (Digital-Analog Converter) unit 65 converts the eccentricity correction data 75 (outputted by the tester control unit 5 for each servo sector) into an analog correction voltage 76. An LPF (Low-Pass Filter) unit 66 converts the analog correction voltage 76 (outputted from the DAC unit 65 according to the setting for each servo sector) into a corrective additional voltage 77 for the primary (1st order) component of the rotation which has been made continuous and smooth throughout the disk rotation by removing 0th order hold steps (level differences). An adder 78 adds the corrective additional voltage 77 outputted by the LPF unit 66 to phase difference voltage 70 outputted by the compensator 62 and inputs the total voltage 71 to the VCO 63.

In the following, the operation of the signal processing unit 2 in this embodiment will be described.

Figure 4:
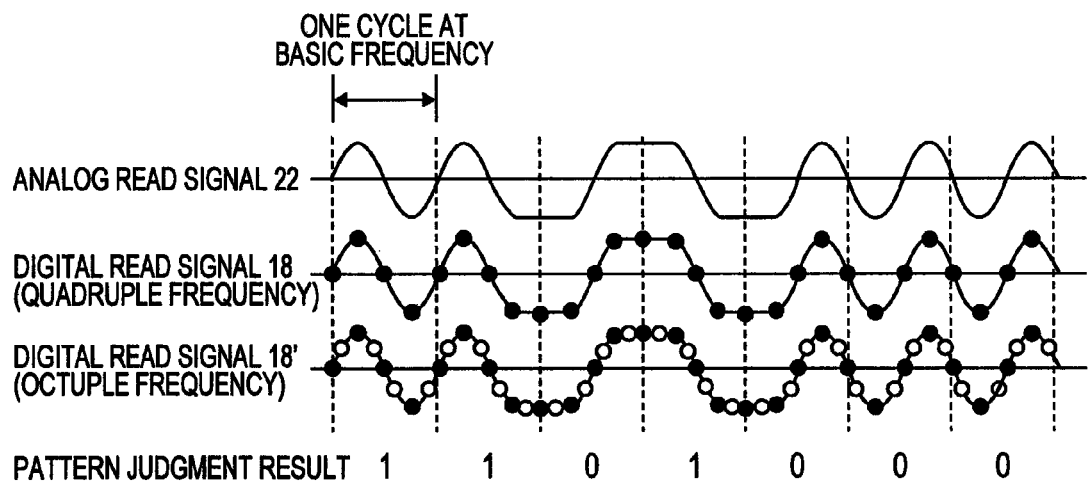
FIG. 4 is a graph showing read signal processing which is executed by an ADC unit.

FIG. 4 is a graph showing read signal processing which is executed by the ADC unit 17. The ADC unit 17 executes the digital conversion of the analog read signal 22 at a frequency four times (or eight times) the basic frequency of the read signal according to the clock output 72 supplied from the PLL clock generating unit 19. The digital read signal 18 (or 18') acquired by the digital conversion is inputted to the servo demodulation unit 30 and the position detecting unit 27. The servo demodulation unit 30 takes in data in the servo pattern code area of the digital read signal 18, makes the pattern judgment (between data "0" and data "1") in each cycle of the basic frequency, and acquires the demodulation result 26 from the 0/1 data sequence.

Meanwhile, the position detecting unit 27 takes in data in the servo position area of the digital read signal 18 and demodulates (acquires) the microscopic position information 24 finer than one track width by executing a calculation process to the data.

Therefore, an error between the frequency four times (or eight times) the basic frequency of the read signal 22 and the frequency of the clock output 72 of the PLL clock generating unit 19 leads to an increase in demodulation errors of the servo pattern code, and to deterioration in the demodulation accuracy of the servo position. Thus, the error between the frequency four times (or eight times) the basic frequency of the read signal 22 and the PLL clock frequency has to be minimized.

Next, the occurrence of the disk eccentricity and a method for learning the disk eccentricity will be explained. When the magnetic disk 10 is mounted on the spin stand 11, it is impossible to attach the magnetic disk 10 to the spin stand 11 with no position error between the track-circle center of the magnetic disk 10 and the rotation-body center of the spin stand 11 due to factors such as the accuracy of the center of the magnetic disk 10 and the accuracy of the attachment to the spin stand 11. An eccentricity of approximately 10 µm-50 µm generally remains.

The servo pattern previously written to the magnetic disk is arranged radially from the track center of the disk so that the frequency and the pattern length become constant irrespective of the track position (from the inner-radius part to the peripheral part). If there exists an eccentricity of the track-circle center of the disk from the rotation-body center of the spin stand 11, a frequency deviation corresponding to the radial position fluctuation from the rotation-body center of the spin stand 11 is caused to the servo pattern frequency of each sector in one rotation of a track. The frequency deviation $\Delta f/F$ can be expressed as $\Delta f/F = \pm \Delta r/R$, where "R" denotes the disk radial position, "$\Delta r$" denotes the eccentricity, "F" denotes the servo pattern frequency, and "$\Delta f$" denotes frequency fluctuation.

Figure 5:
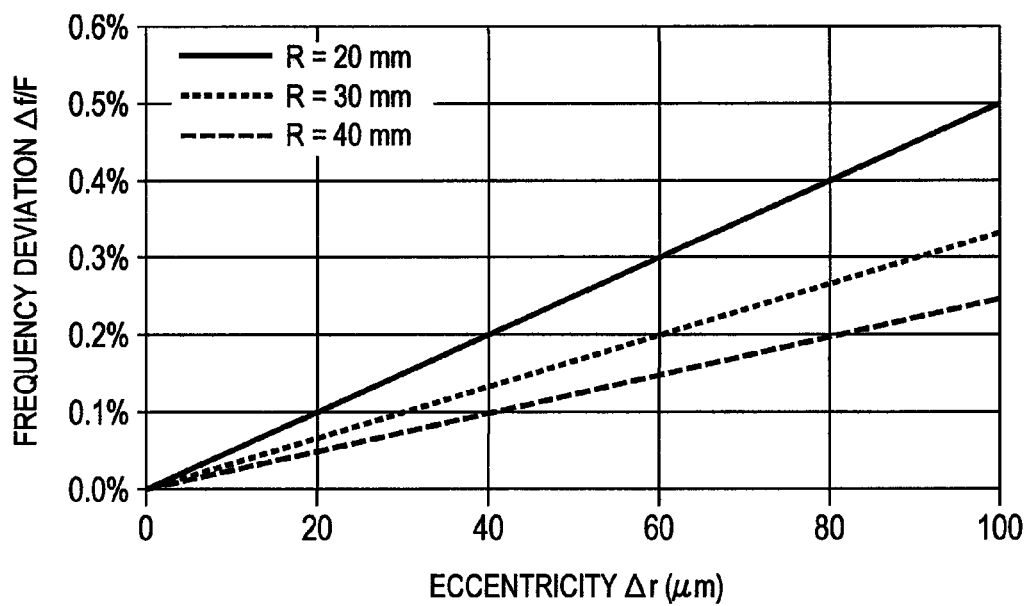
FIG. 5 is a graph showing an example of the relationship between an eccentricity Δr and a frequency deviation Δf/F.

FIG. 5 is a graph showing an example of the relationship between the eccentricity $\Delta r$ and the frequency deviation $\Delta f/F$.

In the inspection device of this embodiment, the disk radial position R is already known since the magnetic head 12 can be moved and positioned by the magnetic head driving unit 1 to any disk radial position. Therefore, the frequency deviation $\Delta f/F$ can be calculated by acquiring the eccentricity $\Delta r$ through a learning process.

The learning of the eccentricity $\Delta r$ can be conducted as below. The magnetic disk 10 is rotated at a prescribed speed and the magnetic head 12 is moved/positioned to and fixed at a prescribed disk radial position R by the magnetic head driving unit 1. By the servo demodulation unit 30 (pattern demodulation unit 34) executing the pattern demodulation to the servo signal read out from the magnetic head 12, the track number and the microscopic position information 24 (position information finer than one track width) demodulated for each sector are acquired. From the acquired data, fluctuation in the track position in one rotation of the disk (i.e., the disk eccentricity) can be determined.

Figure 6A:
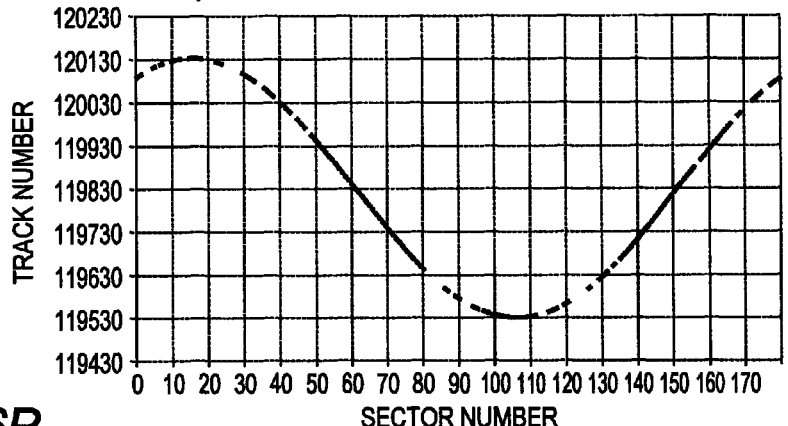
FIGS. 6A-6C are graphs showing an example of track position fluctuation data acquired when there exists a disk eccentricity.
Figure 6B:
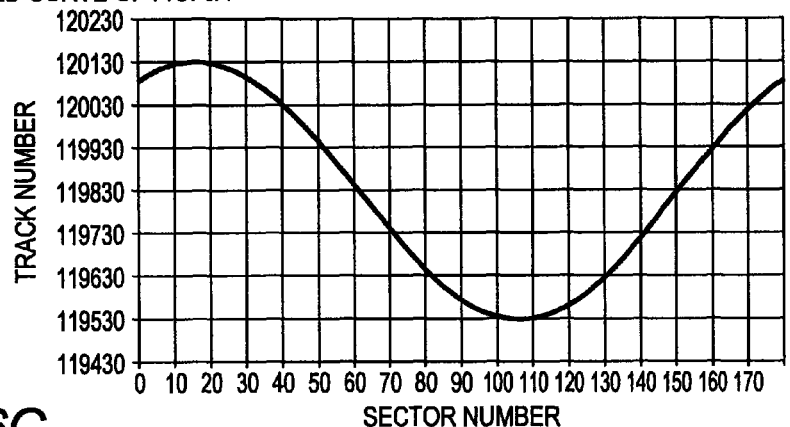
Figure 6C:
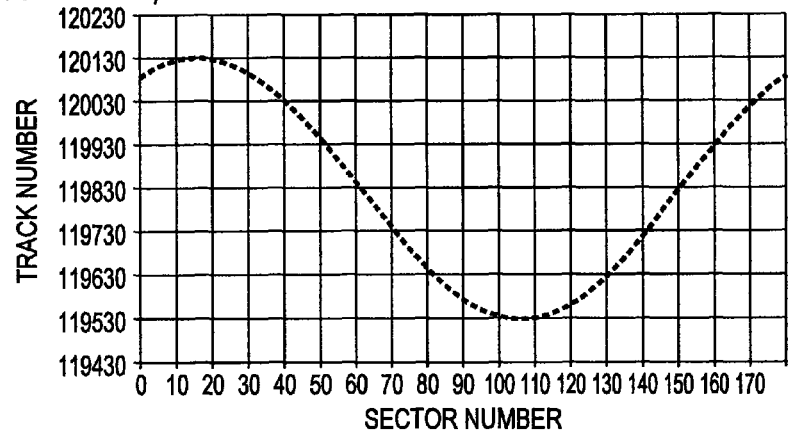

FIGS. 6A-6C are graphs showing an example of the track position fluctuation data acquired by the pattern demodulation when there exists a disk eccentricity, wherein FIG. 6A shows a case where the eccentricity correction is not made to the PLL clock, FIG. 6B shows an approximated curve generated from the data of FIG. 6A, and FIG. 6C shows a case where the eccentricity correction is made to the PLL clock. The explanation of FIG. 6C will be given later.

In the case of FIG. 6A, demodulation errors (data loss) exist in some sectors since the eccentricity correction is not made to the PLL clock. In this case, continuous track position information like that shown in FIG. 6B can be acquired by approximating the primary component of the rotation (dominant component of the eccentricity) using the demodulation result of valid sectors only. Then, the eccentricity Δr of the disk is calculated from the approximated curve of FIG. 6B according to the following expression:

eccentricity Δr=(maximum track number−minimum track number)/2×(track pitch)

The direction of the eccentricity can be judged from the sector position where the track number hits the maximum or the minimum.

In the example of FIGS. 6A and 6B, the maximum track number equals 120130 and the minimum track number equals 119530. When the track pitch is 100 nm, for example, the eccentricity Δr equals 30 μm. The direction of the eccentricity (eccentricity direction) is that of the 15th sector. When the disk radial position R of the magnetic head equals 20 mm, the frequency deviation Δf/F=±Δr/R equals ±0.15%. Thus, it is desirable to make an eccentricity correction (give eccentricity correction values) of ±0.15% to the prescribed PLL clock frequency in the example of FIGS. 6A and 6B.

Subsequently, based on the eccentricity correction values and the eccentricity direction calculated as above, a SIN curve (or a COS curve) representing the phases and corresponding amplitudes of the correction value for one rotation of the disk is determined and an eccentricity correction table is generated by figuring out the correction value at each sector position. The clock output frequency can be shifted by the eccentricity correction value, by referring to the eccentricity correction table and successively adding the correction value to the original value (frequency) in regard to each sector.

Incidentally, the PLL clock generating unit 19 in the inspection device of this embodiment is designed to be capable of arbitrarily setting the clock output frequency according to the frequency division ratio designation 74 supplied from the tester control unit 5 in order to deal with servo patterns at arbitrary frequencies. However, the transfer characteristic (gain characteristic, phase characteristic) of the PLL clock generating unit 19 can not remain constant since the setting change of the clock output frequency is accompanied by a change in the frequency division ratio of the arbitrary-ratio frequency divider 64, the input/output characteristic of the VCO 63 or the disk revolution frequency.

Figure 7:
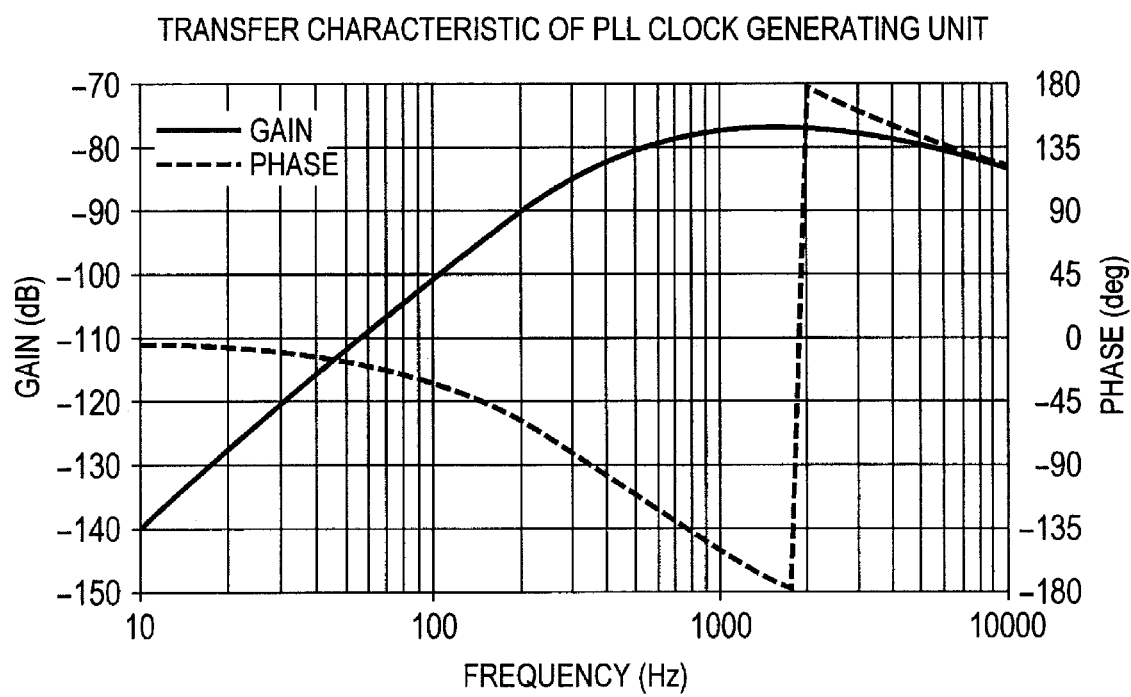
FIG. 7 is a graph showing an example of the transfer characteristic of the PLL clock generating unit.

FIG. 7 is a graph showing an example of the transfer characteristic of the PLL clock generating unit 19, wherein the gain characteristic and the phase characteristic of the clock output 72 with respect to the eccentricity correction data 75 are shown. It is clear from FIG. 7 that the transfer characteristic changes significantly (both the gain and the phase delay increase) with the increase in the clock frequency. Thus, even if the eccentricity correction value is inputted as a constant value, the correction value of the clock frequency outputted from the PLL clock generating unit 19 changes when the setting of the clock frequency or the disk revolution speed is changed. This may mean that the desired correction can not be realized without preparing an eccentricity correction table that compensates for the transfer characteristic of the PLL clock generating unit 19 in regard to each clock frequency. However, it is not easy to prepare such an eccentricity correction table for each of the settings of the clock frequency and the disk revolution speed.

In the inspection device of this embodiment designed considering the above situation, a transfer function Gpll(s) representing the transfer characteristic of the PLL clock generating unit 19 is acquired previously and compensated eccentricity correction values at arbitrary clock frequencies (eccentricity correction data 75) are determined by executing calculations using the functional expression Gpll(s).

Figure 8:
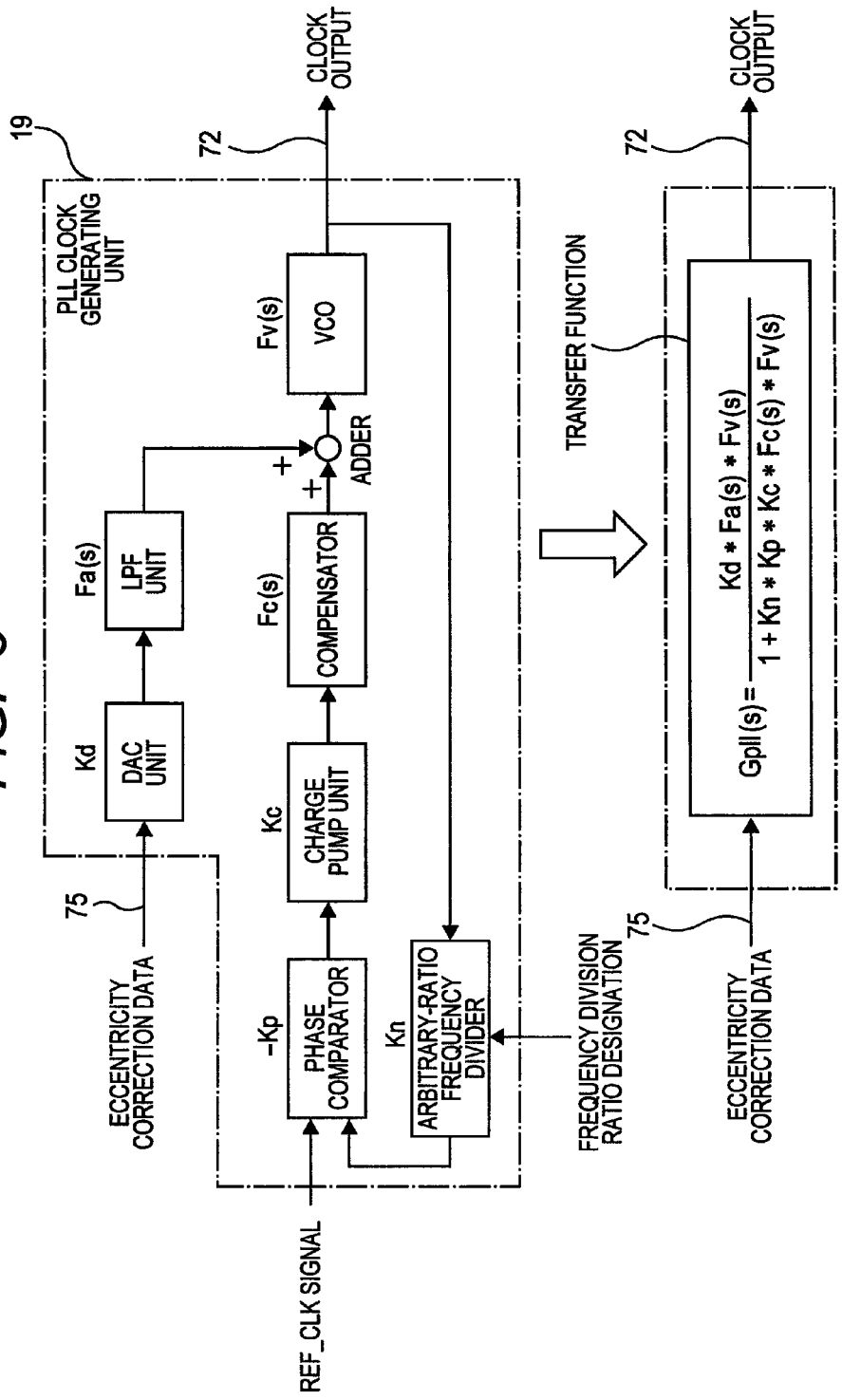
FIG. 8 is a schematic diagram showing a method of determining a transfer function Gpll(s) of the PLL clock generating unit.

FIG. 8 is a schematic diagram showing a method of determining the transfer function Gpll(s) of the PLL clock generating unit 19. The frequency characteristic (the above character "s" represents the frequency) of each component constituting the PLL clock generating unit 19 is analyzed and transfer parameters Kd, Fa(s), Fv(s), etc. of the components are determined. Thereafter, the transfer function Gpll(s) of the whole PLL clock generating unit 19 regarding the clock output 72 with respect to the input of the eccentricity correction data 75 is determined. FIG. 8 shows a concrete parameter configuration of the transfer function Gpll(s).

Figure 9:
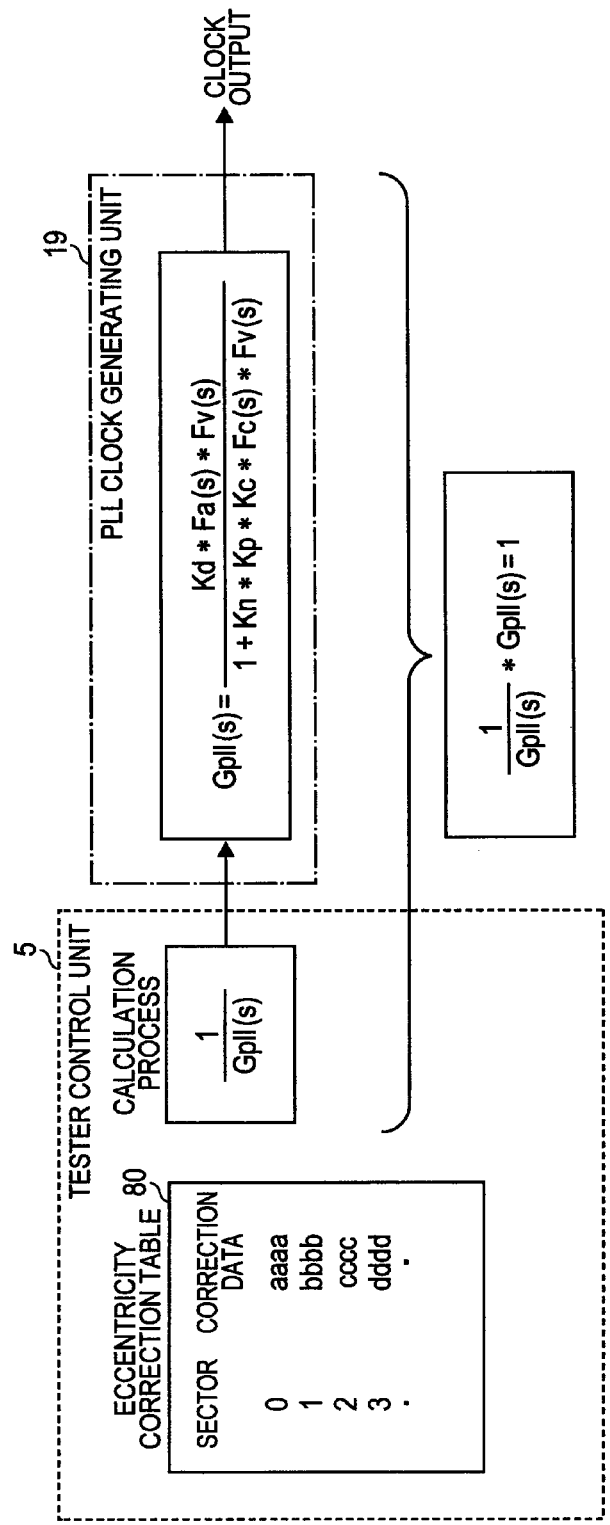
FIG. 9 is a schematic diagram showing a method of compensating eccentricity correction values using the transfer function Gpll(s).

FIG. 9 is a schematic diagram showing a method of compensating the eccentricity correction values using the transfer function Gpll(s) of the PLL clock generating unit 19. The tester control unit 5 has prestored one eccentricity correction table 80 and the above transfer function Gpll(s) for the compensation. The eccentricity correction table 80 prestores correction data for each sector determined from the disk eccentricity by the learning. The correction data (for each sector) is a value that is uniquely given independently of the clock frequency.

The tester control unit 5 substitutes the clock frequency s of the disk (inspection target) into the transfer function Gpll(s) used for the compensation and thereby determines a function value. Subsequently, the tester control unit 5 compensates the correction data by loading the correction data for each sector from the eccentricity correction table 80 and executing a calculation (multiplication) of the loaded correction data and the inverse 1/Gpll(s) of the function value. Thereafter, the tester control unit 5 inputs the compensated correction data to the DAC unit 65 of the PLL clock generating unit 19.

While the PLL clock generating unit 19 has the transfer characteristic represented by the function Gpll(s) with respect to the clock frequency s as explained above, this characteristic is canceled by the calculation process (compensation process) executed by the tester control unit 5 using the inverse 1/Gpll(s). In other words, the effect of the transfer function Gpll(s) of the PLL clock generating unit 19 is canceled and it becomes unnecessary to change the eccentricity correction table for each setting change of the clock frequency and the disk revolution speed. Therefore, the eccentricity correction of the clock frequency for the disk eccentricity can be implemented with extreme ease even with arbitrary settings of the clock frequency and the disk revolution speed.

FIG. 6C is a graph showing an example of the track position fluctuation data acquired by the pattern demodulation in the case where the eccentricity correction is made to the PLL clock. By demodulating the servo pattern in the state in which the eccentricity correction has been made to the clock output, the loss of the demodulated data (position information demodulation errors) can be eliminated and the position signal detection accuracy can be improved compared to the aforementioned case of FIG. 6A without the eccentricity correction. Further, by learning the eccentricity again in the state in which the eccentricity correction has been made to the clock output, a more correct disk eccentricity can be acquired.

Consequently, more precise eccentricity clock correction and servo demodulation became possible.

As described above, according to this embodiment, the reduction of the position information demodulation errors of a general-purpose servo demodulation circuit and the improvement of the position signal detection accuracy are realized. Further, a high-accuracy and high-performance inspection device for inspecting a magnetic disk or a magnetic head can be provided through the realization of the quick disk eccentricity correction for arbitrary clock frequencies.

What is claimed is:

1. An inspection device for a magnetic disk or a magnetic head which measures a characteristic of the magnetic disk or the magnetic head by controlling the magnetic head based on servo information written on the magnetic disk and reading or writing a signal from/to the magnetic disk, comprising:

a servo demodulation unit which demodulates the servo information read out from the magnetic disk;

a PLL clock generating unit which generates a reference clock corresponding to the frequency of the servo information read out from the magnetic disk and supplies the reference clock to the servo demodulation unit; and a tester control unit which controls the operation of the inspection device, wherein:

the PLL clock generating unit includes an eccentricity correction circuit for correcting the frequency of the reference clock depending on an eccentricity of the magnetic disk, and the tester control unit generates correction data for correcting the frequency of the reference clock, multiplies the correction data by the inverse of a transfer function of the PLL clock generating unit, and supplies the product to the eccentricity correction circuit.

2. The inspection device for a magnetic disk or a magnetic head according to claim 1, wherein the tester control unit stores:

an eccentricity correction table describing the correction data for each sector position based on the eccentricity of the magnetic disk; and the transfer function representing the transfer characteristic of the PLL clock generating unit.

3. The inspection device for a magnetic disk or a magnetic head according to claim 1, wherein the eccentricity of the magnetic disk is acquired as fluctuation in the track position of the magnetic head in one rotation of the disk by acquiring the track number at each sector position by fixing the magnetic head at a prescribed disk radial position and demodulating a servo signal read out from the rotating magnetic disk with the servo demodulation unit.

4. An inspection method for a magnetic disk or a magnetic head for measuring a characteristic of the magnetic disk or the magnetic head by controlling the magnetic head based on servo information written on the magnetic disk and reading or writing a signal from/to the magnetic disk, comprising the steps of:

demodulating the servo information read out from the magnetic disk according to a reference clock;

generating the reference clock corresponding to the frequency of the servo information read out from the magnetic disk using a PLL clock generating unit; and correcting the frequency of the reference clock depending on an eccentricity of the magnetic disk, wherein:

the step of correcting the frequency of the reference clock generates correction data corresponding to the eccentricity of the magnetic disk, multiplies the correction data by the inverse of a transfer function of the PLL clock generating unit, and supplies the product to the PLL clock generating unit.

5. The inspection method for a magnetic disk or a magnetic head according to claim 4, wherein the eccentricity of the magnetic disk is acquired as fluctuation in the track position of the magnetic head in one rotation of the disk by acquiring the track number at each sector position by fixing the magnetic head at a prescribed disk radial position and demodulating a servo signal read out from the rotating magnetic disk.

* * * * *